United States Patent
Ban et al.

(10) Patent No.: US 10,837,206 B2
(45) Date of Patent: Nov. 17, 2020

(54) LOCK DEVICE FOR VEHICLES

(71) Applicant: SHIROKI CORPORATION, Fujisawa (JP)

(72) Inventors: Masahiro Ban, Fujisawa (JP); Takayuki Hirose, Fujisawa (JP); Yuki Abe, Fujisawa (JP); Keisuke Nomura, Toyokawa (JP)

(73) Assignee: SHIROKI CORPORATION, Fujisawa (JP)

( * ) Notice: Subject to any disclaimer, the term of this patent is extended or adjusted under 35 U.S.C. 154(b) by 0 days.

(21) Appl. No.: 16/349,856

(22) PCT Filed: Oct. 30, 2017

(86) PCT No.: PCT/JP2017/039095
§ 371 (c)(1),
(2) Date: May 14, 2019

(87) PCT Pub. No.: WO2018/092570
PCT Pub. Date: May 24, 2018

(65) Prior Publication Data
US 2020/0056409 A1    Feb. 20, 2020

(30) Foreign Application Priority Data
Nov. 17, 2016    (JP) .................... 2016-224563

(51) Int. Cl.
*E05B 85/26*    (2014.01)
*B60N 2/90*    (2018.01)
(Continued)

(52) U.S. Cl.
CPC .............. *E05B 85/26* (2013.01); *B60N 2/015* (2013.01); *B60N 2/90* (2018.02); *E05B 83/00* (2013.01)

(58) Field of Classification Search
CPC .. Y10T 292/1047; Y10S 292/23; E05B 85/04; E05B 85/26; B60N 2/90
(Continued)

(56) References Cited

U.S. PATENT DOCUMENTS

| 4,235,462 A | * | 11/1980 | Torii | ....................... E05B 77/38 |
| | | | | 292/216 |
| 5,941,579 A | * | 8/1999 | Baniak | .................... E05B 85/26 |
| | | | | 292/201 |

(Continued)

FOREIGN PATENT DOCUMENTS

| JP | 2011-156879 A | 8/2011 |
| JP | 2014141241 A | 8/2014 |

OTHER PUBLICATIONS

International Search Report (PCT/ISA/210) dated Jan. 16, 2018, by the Japanese Patent Office as the International Searching Authority for International Application No. PCT/JP2017/039095.
(Continued)

*Primary Examiner* — Terrell L McKinnon
*Assistant Examiner* — Michael McDuffie
(74) *Attorney, Agent, or Firm* — Buchanan Ingersoll & Rooney PC

(57) ABSTRACT

A vehicle lock device includes a base member, a latch, and a release lever. The base member includes a base groove, into which a striker is inserted. The latch includes a latch groove into which the striker is inserted. The latch is pivotal between a lock position, where the striker is fixed to the base groove, and an unlock position, where the striker is released from the base groove. The release lever is pivotal between a lock release position, where pivoting of the latch is permitted from the lock position to the unlock position, and a restriction position, where pivoting of the latch is restricted from the lock position to the unlock position. The release lever includes an engagement release member that contacts
(Continued)

the latch when pivoted from the restriction position to the lock release position to pivot the latch from the lock position to the unlock position.

5 Claims, 6 Drawing Sheets

(51) Int. Cl.
B60N 2/015 (2006.01)
E05B 83/00 (2014.01)
(58) Field of Classification Search
USPC ............ 248/220.21, 220.22, 221.11, 222.12, 248/222.13, 223.41, 225.11
See application file for complete search history.

(56) References Cited

U.S. PATENT DOCUMENTS

| | | | | |
|---|---|---|---|---|
| 6,435,575 | B1* | 8/2002 | Pajak | E05B 81/14 292/201 |
| 6,733,078 | B1* | 5/2004 | Zelmanov | B60N 2/2245 292/201 |
| 2008/0203737 | A1* | 8/2008 | Tomaszewski | E05B 77/26 292/216 |
| 2008/0217929 | A1* | 9/2008 | Zweibohmer | E05C 3/24 292/216 |
| 2009/0145183 | A1* | 6/2009 | Maeta | B60N 2/01583 70/237 |
| 2009/0199605 | A1* | 8/2009 | Spurr | E05B 81/14 70/266 |
| 2011/0198870 | A1* | 8/2011 | Nagaoka | E05B 77/265 292/200 |
| 2012/0056437 | A1* | 3/2012 | Takayanagi | E05B 77/265 292/118 |
| 2012/0068479 | A1* | 3/2012 | Bendel | E05B 81/20 292/200 |
| 2012/0291358 | A1* | 11/2012 | Konchan | E05B 77/02 49/394 |
| 2012/0292927 | A1* | 11/2012 | Vazquez | B23P 11/00 292/200 |
| 2014/0319852 | A1* | 10/2014 | Shimura | E05B 79/08 292/216 |
| 2014/0361554 | A1* | 12/2014 | Ferri | E05B 85/26 292/200 |
| 2015/0329019 | A1 | 11/2015 | Abe et al. | |
| 2015/0368934 | A1* | 12/2015 | Tomaszewski | B60Q 9/00 292/199 |
| 2016/0214506 | A1* | 7/2016 | Mueller | E05B 77/38 |
| 2016/0215536 | A1* | 7/2016 | Cumbo | E05B 85/26 |
| 2017/0260774 | A1* | 9/2017 | Schwickerath | E05B 63/042 |

OTHER PUBLICATIONS

Office Action (Notice of Reasons for Refusal) dated Jun. 9, 2020, by the Japanese Patent Office in corresponding Japanese Patent Application No. 2016-224563 and an English Translation of the Office Action. (6 pages).

* cited by examiner

LOCK DEVICE FOR VEHICLES

TECHNICAL FIELD

The present invention relates to a vehicle lock device.

BACKGROUND ART

Patent Document 1 discloses a vehicle seat lock device as an example of a conventional vehicle lock device. The lock device includes a striker fixed to a vehicle, a base member including a base groove into which the striker is insertable, a transfer mechanism connected to the base member, and a cable member connected to the transfer mechanism. The vehicle and the striker serve as a stationary member. The base member is attached to a leg of a vehicle seat. The vehicle seat and the leg serve as a movable member. The base member is movable between a lock position at which the striker is fixed to the base groove and an unlock position at which the striker is released from the base groove. When the base member is moved from the lock position to the unlock position or in the opposite direction, the transfer mechanism hinders movement of the base member by biasing the base member with an elastic member. In the lock mechanism, the cable member connected to the transfer mechanism is pulled upward to move the base member from the lock position to the unlock position with the transfer mechanism disengaging the vehicle seat and the striker.

PRIOR ART DOCUMENT

Patent Document

Patent Document 1: Japanese Laid-Open Patent Publication No. 2014-141241

SUMMARY OF THE INVENTION

Problems that the Invention is to Solve

In the vehicle lock device, the base member may not be moved from the lock position to the unlock position if the force applied to the base member is weak when the base member is supposed to move from the lock position to the unlock position. Thus, the stationary member and the movable member may not be released from the locked state.

It is an object of the present invention to provide a vehicle lock device that easily releases the stationary member and the movable member from a locked state with a simple structure.

Means for Solving the Problems

A vehicle lock device that achieves the object includes a base member, a latch, and a release lever. The base member includes a base groove, into which a striker fixed to one of a stationary member and a movable member is inserted. The base member is fixed to the other one of the stationary member and the movable member. The latch is pivotally connected to the base member. The latch includes a latch groove into which the striker is inserted. The latch is pivotal between a lock position, at which the striker is fixed to the base groove, and an unlock position, at which the striker is released from the base groove. The release lever is pivotally connected to the base member. The release lever is pivotal between a lock release position, at which pivoting of the latch is permitted from the lock position to the unlock position, and a restriction position, at which pivoting of the latch is restricted from the lock position to the unlock position. The release lever is pivoted from the restriction position to the lock release position by a lock release operation. The release lever includes an engagement release member that contacts the latch when pivoted from the restriction position to the lock release position to pivot the latch from the lock position to the unlock position.

With this structure, the release lever contacts the latch when pivoted from the restriction position to the lock release position to pivot the latch from the lock position to the unlock position. Thus, the striker and the base member are easily released from a locked state. This easily releases the stationary member and the movable member from the locked state with a simple structure.

Preferably, the above vehicle lock device further includes a cam member pivotally connected to the base member and engaged with the latch at the lock position. When the latch is located at the lock position and the release lever is pivoted from the restriction position to the lock release position, the release lever contacts the cam member and releases the engagement of the cam member and the latch.

With this structure, as the release lever pivots from the restriction position to the lock release position, the engagement of the cam member and the latch is released. This easily pivots the latch from the lock position to the unlock position.

Preferably, when the release lever is pivoted from the restriction position to the lock release position, after the engagement of the cam member and the latch is released, the release lever brings the engagement release member and the latch into contact to pivot the latch to the unlock position.

With this structure, the latch is smoothly pivoted from the lock position to the unlock position.

Preferably, the latch is configured to be in an engagement state engaged with the release lever at a middle position from when pivoting of the latch is started by the engagement release member from the lock position toward the unlock position to when the latch reaches the unlock position. The release lever restricts pivoting of the latch to the lock position in the engagement state.

When the latch is pivoted from the lock position to the unlock position, force to pivot to the lock position may be applied to the latch due to the weight of the movable member, for example. With this structure, when the latch is pivoted from the lock position to the unlock position, returning to the lock position is restricted.

BRIEF DESCRIPTION OF THE DRAWINGS

FIG. 1 is a perspective view showing a backseat of a vehicle on which a vehicle lock device according to one embodiment is installed.

FIG. 2 is a front view of a lock unit included in the vehicle lock device in FIG. 1.

MODES FOR CARRYING OUT THE INVENTION

Figure 3:
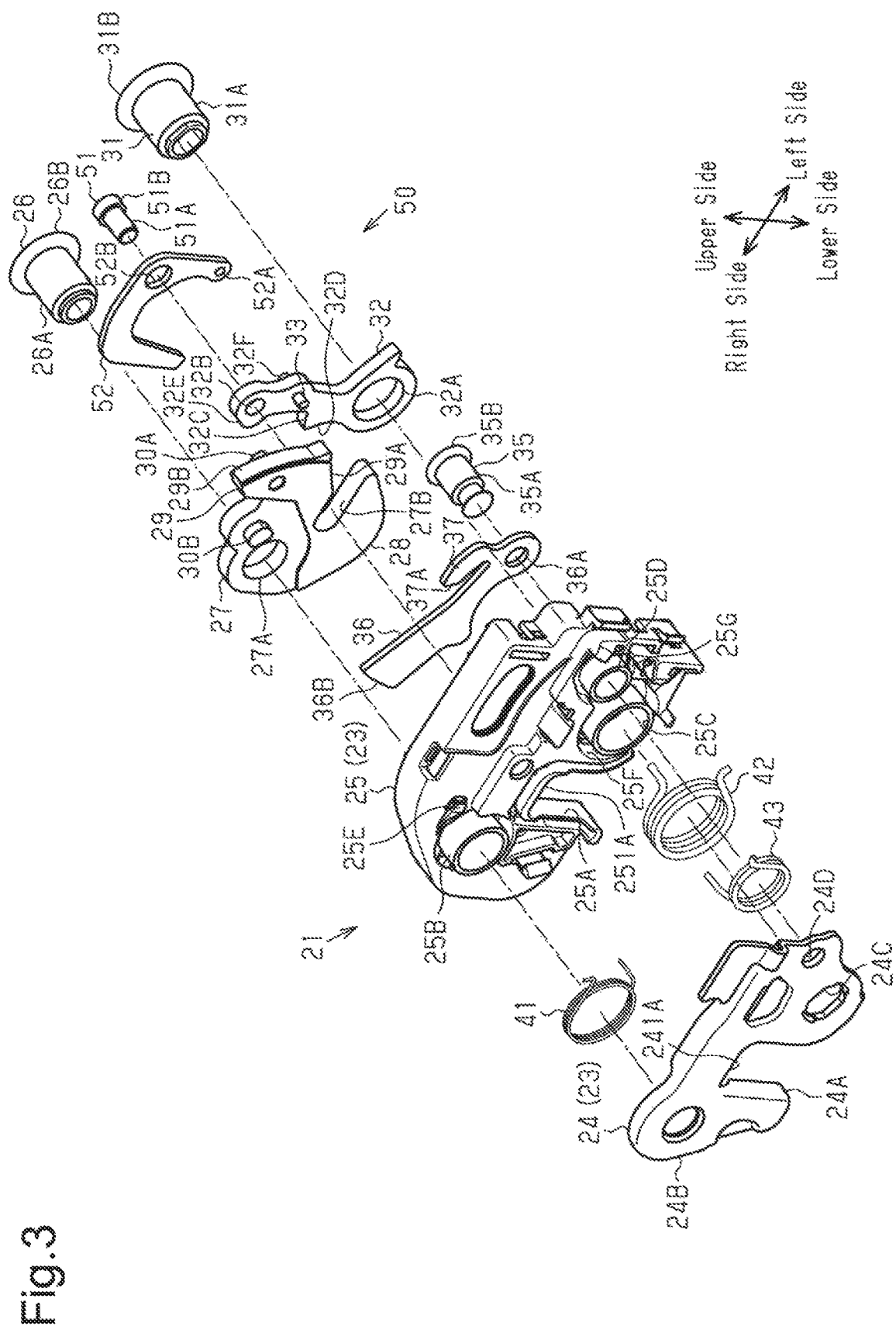
FIG. 3 is an exploded perspective view of the lock unit in FIG. 2.

One embodiment of a vehicle lock device for a vehicle seat installed on a backseat of a vehicle such as an automobile will now be described with reference FIGS. 1 to 10.

The vehicle lock device includes a lock unit 21. The lock unit 21 will now be described. The side of open ends of base grooves 24A, 25A (described later) in the lock unit 21, into which a striker 20 is inserted, is referred to as the lower side and the opposite side is referred to as the upper side for the sake of convenience. Further, in the lock unit 21, the surface where a base member 23 (described later) is located is referred to as the back surface, and the surface at the opposite side is referred to as the front surface. Further, the lock unit 21 is arranged so that its up-down direction lines along the vertical direction. The right hand side of the lock unit 21 in a front view is defined as the "right side," and the left hand side of the lock unit 21 is defined as the "left side" (see FIG. 3).

Figures 1, 2:
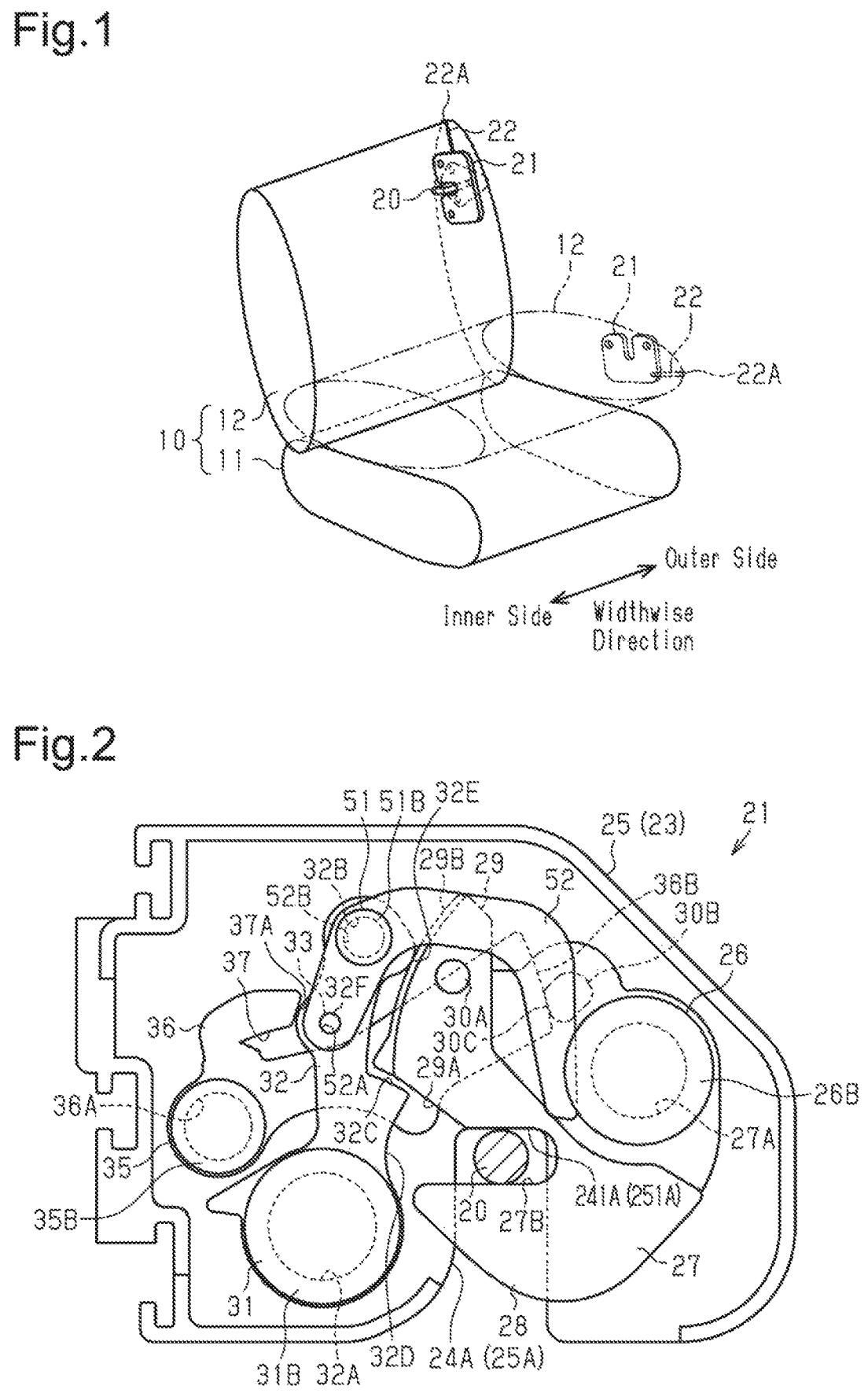

As shown in FIG. 1, a backseat 10 includes a rear end of a seat cushion 11 that serves as a seat for an occupant and supports a lower end of a seat back 12, which serves as a movable member and forms a backrest, in an inclinable manner in a front-rear direction. The lock unit 21 is arranged on a surface of the seat back 12 located at the outer side in the widthwise direction. The striker 20, which is constructed by a metal rod or the like, is fixed to the vehicle (not shown) serving as a stationary member as shown by solid lines in FIG. 1. The surface of the striker 20 extending in the widthwise direction is opposed to the lock unit 21 when the seat back 12 is raised rearward. A rod-shaped operation lever 22 is coupled to one end of the lock unit 21. An operation switch 22A of the operation lever 22 is exposed to the outside from the outer side of the seat back 12.

When the seat back 12 is raised rearward, the striker 20 is engaged with the lock unit 21 thereby maintaining the position of the seat back 12. When the operation lever 22 is operated to operate the operation switch 22A, the striker 20 is disengaged from the lock unit 21 to allow the seat back 12 to be inclined forward relative to the seat cushion 11 as shown by the double-dashed lines in FIG. 1.

The lock unit 21 will now be described in detail with reference to FIG. 3. FIG. 3 is an exploded perspective view of the lock unit 21 taken from the rear side of the lock unit 21.

As shown in FIG. 3, the base member 23, which serves as a case of the lock unit 21, includes a base plate 24 formed by a metal plate or the like and a substantially box-shaped base housing 25 made of a resin material or the like and placed on the base plate 24 in the thickness-wise direction of the base plate 24. The base plate 24 and the base housing 25 include substantially U-shaped base grooves 24A, 25A, respectively. The base grooves 24A, 25A are open so as to be directed toward the striker 20 (see FIG. 1) in a movement path of the base grooves 24A, 25A when the seat back 12 (see FIG. 1) is raised rearward. The base grooves 24A, 25A are substantially C-shaped in a front view of the lock unit 21. When the seat back 12 is raised rearward, the striker 20 is inserted into the base grooves 24A, 25A. When the seat back 12 is inclined forward, the base grooves 24A, 25A are disengaged from the striker 20. Inner end surfaces at the innermost parts of the base grooves 24A, 25A serve as bottom surfaces 241A, 251A, which can come into contact with the striker 20.

The base plate 24 includes a circular fastening hole 24B formed at the upper right side of the base groove 24A, a substantially elliptic fastening hole 24C located at the side of the fastening hole 24B opposite to the base groove 24A, and a circular fastening hole 24D formed at the upper left side of the fastening hole 24C.

The base housing 25 includes a cylindrical boss 25B projecting from the base housing 25 coaxially with the fastening hole 24B, a cylindrical boss 25C projecting from the base housing 25 coaxially with the fastening hole 24C, and a cylindrical boss 25D projecting from the base housing 25 coaxially with the fastening hole 24D. The base housing 25 also includes a substantially arcuate and cylindrical spring seat 25E located at the left side of the boss 25B coaxially with the boss 25B, a substantially arcuate and cylindrical spring seat 25F located at the upper right side of the boss 25C coaxially with the boss 25C, and a substantially arcuate and cylindrical spring seat 25G located at the lower side of the boss 25D coaxially with the boss 25D.

A latch 27 formed by a plate is pivotally connected to the base member 23 by a latch bushing 26 inserted into the boss 25B. The latch bushing 26 includes a substantially cylindrical support 26A and a flange 26B. The support 26A is press-fitted into the boss 25B, and a distal end of the support 26A is fitted into the fastening hole 24B. The flange 26B extends outward in the radial direction from the end of the support 26A separated from the base plate 24.

The latch 27 includes a circular insertion hole 27A having an inner diameter that corresponds to the outer diameter of the support 26A. The latch 27 is pivotally supported by the support 26A inserted into the insertion hole 27A so that movement in the axial direction is restricted between a distal end surface of the boss 25B and the flange 26B.

The latch 27 is located near the base grooves 24A, 25A and includes a substantially U-shaped latch groove 27B recessed toward the central portion of the latch 27 so that the latch 27 is substantially C-shaped. The width of the opening of the latch groove 27B is set to be slightly greater than the diameter of the striker 20 (see FIG. 2). The latch 27 includes a first engagement portion 28 and a second engagement portion 29. The first engagement portion 28 is located on the latch 27 closer to the open ends of the base grooves 24A, 25A than the latch groove 27B. The second engagement portion 29 is located at the same side as the bottom surfaces 241A, 251A, which are located at the side opposite to the open ends of the base grooves 24A, 25A.

The second engagement portion 29 includes a cylindrical first latch projection 30A projecting in the thickness-wise direction of the second engagement portion 29 from the surface of the second engagement portion 29 at the side opposite to the surface that faces the base housing 25. The second engagement portion 29 includes a first latch engagement surface 29A having a substantially arcuate surface. The first latch engagement surface 29A is an end surface continuous with the latch groove 27B. The second engagement portion 29 includes a second latch engagement surface 29B having a substantially arcuate surface extending about the insertion hole 27A of the latch bushing 26. The second latch engagement surface 29B is an end surface continuous with the first latch engagement surface 29A. The surface of the second engagement portion 29 that faces the base housing 25 includes a middle part located between the insertion hole 27A and the second latch engagement surface 29B. A second latch projection 30B projects in the thickness-wise direction of the second engagement portion 29 from the middle part of the second engagement portion 29.

A release lever 50 formed by a plate is pivotally connected to the base member 23 by a first lever bushing 31 inserted into the boss 25C. The first lever bushing 31 includes a substantially cylindrical support 31A and a flange 31B. The support 31A is press-fitted into the boss 25C, and a distal end of the support 31A is fitted into the fastening hole 24C. The flange 31B extends outward in the radial direction from an end of the support 31A at the side separated from the base plate 24.

The release lever 50 includes a pawl 32 that is connected to the base member 23 by the first lever bushing 31 and an engagement release member 52 that is connected to the pawl 32 by a second lever bushing 51. The second lever bushing 51 includes a substantially cylindrical support 51A and a flange 51B. The support 51A is inserted into the pawl 32 and the engagement release member 52. The flange 51B extends outward in the radial direction from an end of the support 51A at the side separated from the base housing 25.

The pawl 32 includes a circular insertion hole 32A having an inner diameter that corresponds to the outer diameter of the support 31A. The pawl 32 also includes a circular connection hole 32B having an inner diameter that corresponds to the outer diameter of the support 51A. The inner diameter of the connection hole 32B is smaller than the inner diameter of the insertion hole 32A. The pawl 32 further includes a pawl projection 32F located between the insertion hole 32A and the connection hole 32B in the longitudinal direction of the pawl 32. The pawl projection 32F projects in the thickness-wise direction of the pawl 32 from the surface of the pawl 32 located at the side opposite to the surface that faces the base housing 25.

The pawl 32 is pivotally supported by the support 31A inserted into the insertion hole 32A so that movement in the axial direction is restricted between a distal end surface of the boss 25C and the flange 31B. The pawl 32 is arranged so that the position in the axial direction corresponds to the latch 27. The thickness of the pawl 32 is set to be the same as the latch 27.

The width of the distal end of the pawl 32 is reduced from a step 32C located at a middle part of the pawl 32 in the longitudinal direction of the pawl 32 and opposed to the latch 27. The step 32C is shaped to be a substantially arcuate surface extending about the insertion hole 32A. In a state in which the first latch engagement surface 29A is arranged close to the step 32C as shown in FIG. 2, the center of the arcuate surface (or substantially arcuate surface) of the first latch engagement surface 29A substantially corresponds to the center of the insertion hole 32A. The pawl 32 includes a first pawl engagement surface 32D that is located closer to the insertion hole 32A than the step 32C and a second pawl engagement surface 32E located closer to the connection hole 32B than the step 32C.

The first pawl engagement surface 32D is a substantially arcuate surface. The second pawl engagement surface 32E is located at a position spaced from the step 32C in the radial direction of the insertion hole 32A. A substantially cylindrical pawl engagement projection 33 projects in the thickness-wise direction of the pawl 32 from a position near the step 32C of the pawl 32 at a lower side of the connection hole 32B. The pawl engagement projection 33 and the pawl projection 32F are coaxial.

The engagement release member 52 is curved to extend from the pawl 32 and beyond the first latch projection 30A of the latch 27 as shown in FIG. 2. The engagement release member 52 includes a circular joining hole 52A having an inner diameter that corresponds to the outer diameter of the pawl projection 32F of the pawl 32 and a circular insertion hole 52B having an inner diameter that corresponds to the outer diameter of the support 51A (see FIG. 3). The pawl projection 32F of the pawl 32 is inserted into the joining hole 52A of the engagement release member 52. The support 51A (see FIG. 3) of the second lever bushing 51 is inserted into the insertion hole 52B of the engagement release member 52 and the connection hole 32B of the pawl 32. Thus, even if the pawl 32 is pivoted about the support 31A (see FIG. 3), the relative position of the engagement release member 52 and the pawl 32 remains unchanged. That is, the engagement release member 52 and the pawl 32 are integrally pivoted about the support 31A.

A latch spring 41 formed by a torsion coil spring is arranged on the boss 25B as shown in FIG. 3. The latch spring 41 has one end held by the spring seat 25E and another end held by the latch 27. The latch spring 41 biases and pivots the latch 27 in the counterclockwise direction in FIG. 2.

A pawl spring 42 formed by a torsion coil spring is arranged on the boss 25C. The pawl spring 42 has one end held by the spring seat 25F and another end held by the pawl 32. The pawl spring 42 biases and pivots the pawl 32 in the counterclockwise direction in FIG. 2.

Figure 6:
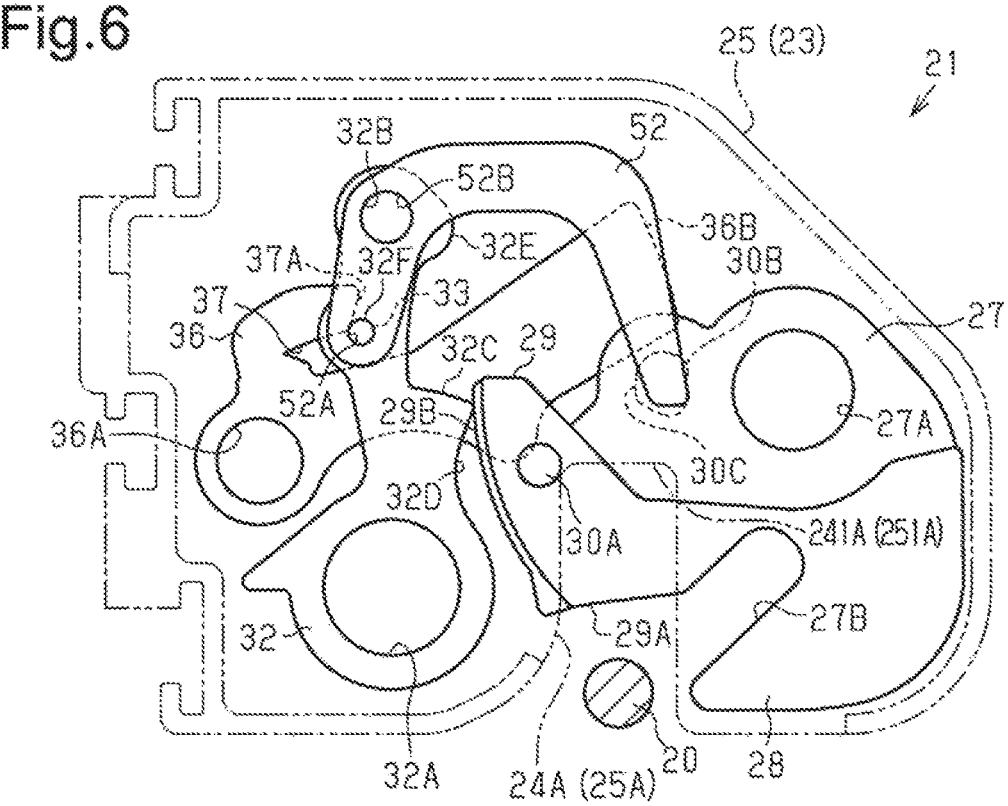
FIG. 6 is a front view schematically showing the lock unit in FIG. 2 when a latch is in an unlock position.
Figure 9:
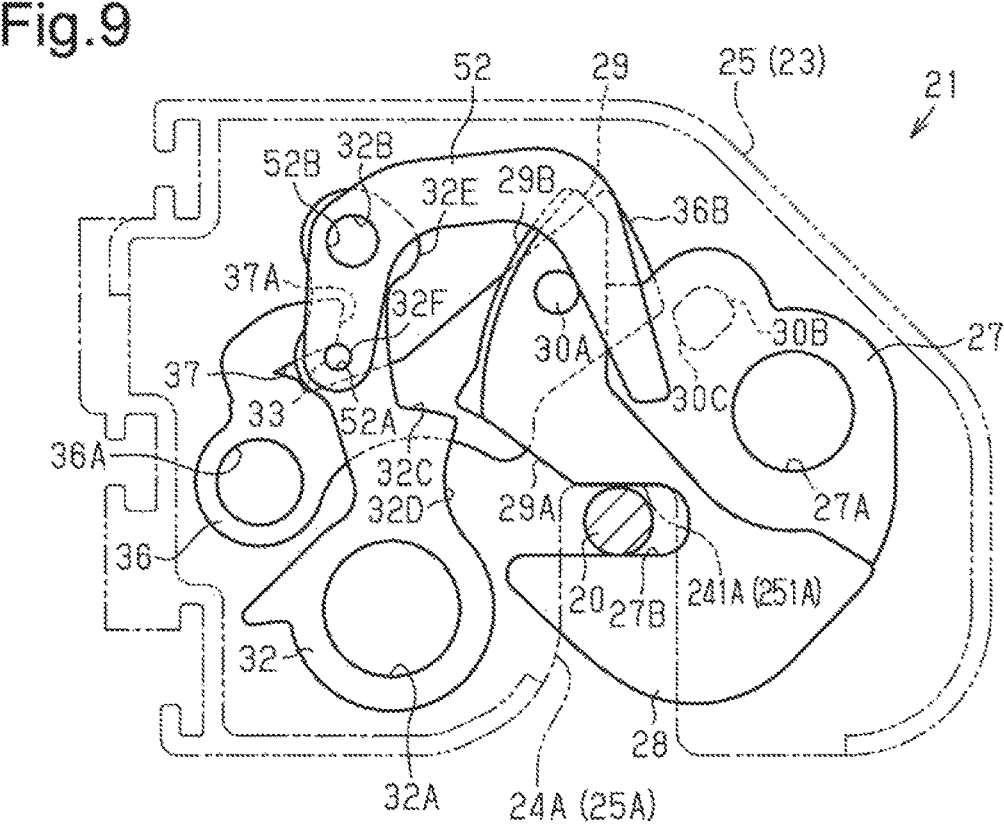
FIG. 9 is a front view schematically showing the lock unit in FIG. 2 in a state immediately before being locked.
Figure 10:
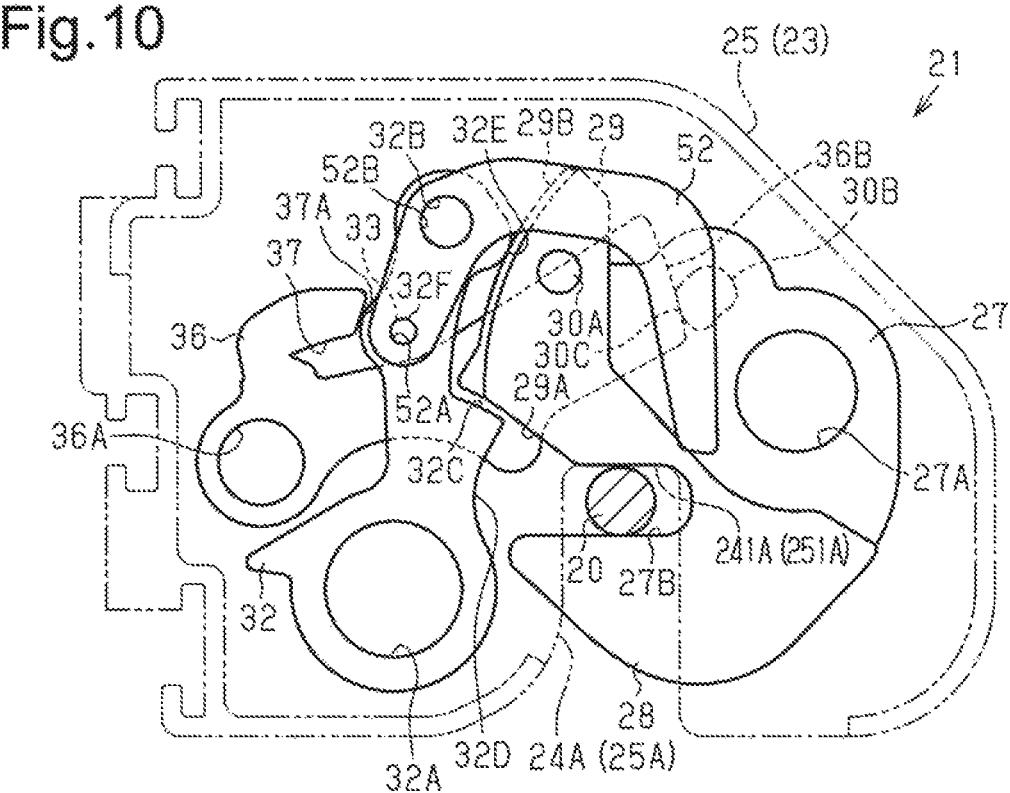
FIG. 10 is a front view schematically showing the lock unit in FIG. 2 when the latch is in a lock position.

The operations of the latch 27 and the pawl 32 when the striker 20 is inserted into the lock unit 21 will now be described with reference to FIGS. 6, 9, and 10. In FIGS. 6 to 10, the base housing 25 is shown by the double-dashed lines, and members other than the pawl 32, the latch 27, and a cam member 36 of the lock unit 21 are not illustrated.

Referring to FIG. 6, the latch 27, which is pivotally biased by the latch spring 41 (see FIG. 3), is located at a predetermined pivotal position (hereafter referred to as "the unlock position") when pivoted in the counterclockwise direction of FIG. 6 so that an opposing surface of the latch 27 abuts the inner wall surface of the base housing 25. The pawl 32 pivotally biased by the pawl spring 42 (see FIG. 3) is located at a pivotal position (hereafter referred to as "the permitting position") at which the distal end of the first pawl engagement surface 32D contacts the second latch engagement surface 29B. When the pawl 32 is in the permitting position, the first latch engagement surface 29A extends across the base grooves 24A, 25A. Thus, when the striker 20 is inserted into the base grooves 24A, 25A, the first latch engagement surface 29A is pressed by the striker 20. This pivots the latch 27 in the clockwise direction from the position shown in FIG. 6 against the biasing force of the latch spring 41 as the second latch engagement surface 29B slides on the first pawl engagement surface 32D. As a result, the striker 20 inserted into the base grooves 24A, 25A enters the latch groove 27B via the first latch engagement surface 29A. The pawl 32 permits the latch 27 to pivot while remaining in the permitting position while hardly pivoting about the insertion hole 32A.

In a state in which the second latch engagement surface 29B has reached a terminal end of the first pawl engagement surface 32D of the pawl 32 (end of first pawl engagement surface 32D located near step 32C) (hereafter referred to as "the state immediately before being locked"), when the latch 27 pressed by the striker 20 is further pivoted in the clockwise direction in FIG. 9, the second latch engagement surface 29B releases the first pawl engagement surface 32D (see FIG. 9). Thus, the pawl 32 is biased and pivoted by the pawl spring 42 (see FIG. 3) in the clockwise direction from the position shown in FIG. 9 so that the step 32C opposes the first latch engagement surface 29A. Then, the second pawl engagement surface 32E abuts the second latch engagement surface 29B as shown in FIG. 10. In this case, the step 32C of the pawl 32 restricts the pivoting of the latch 27 in the direction toward the unlock position because the step 32C is located in the pivoting path of the first latch engagement surface 29A of the second engagement portion 29 in the counterclockwise direction.

The latch 27 fixes the striker 20, which is in the latch groove 27B, between the base grooves 24A, 25A and the first engagement portion 28 so that the first engagement portion 28 extends across the base grooves 24A, 25A. The pivotal position of the latch 27 (position of the release lever 50) in this case will be referred to as the "lock position." Further, the pivotal position of the pawl 32 (position of the release lever 50) in which the second latch engagement surface 29B abuts the second pawl engagement surface 32E as shown in FIG. 10 will be referred to as the "restriction position."

As described above, pivoting of the latch 27 is permitted between the unlock position and the lock position when the pawl 32 is in the permitting position. Further, pivoting of the latch 27 in the lock position is restricted in the direction toward the unlock position when the pawl 32 is in the restriction position. When the latch 27 is in the lock position, a latch engagement surface 30C of the second latch projection 30B is opposed to the boss 25D (described later) into which a cam pin 35 that supports the cam member 36 is press-fitted.

The cam member 36 will now be described.

As shown in FIG. 3, the cam member 36 formed by a plate is pivotally connected to the base member 23 by the cam pin 35 inserted into the boss 25D. The cam pin 35 includes a substantially cylindrical support 35A and a flange 35B. The support 35A is press-fitted into the boss 25D, and a distal end of the support 35A is fitted into the fastening hole 24D. The flange 35B extends outward in the radial direction from an end of the support 35A at the side separated from the base plate 24.

The cam member 36 includes a circular insertion hole 36A having an inner diameter that corresponds to the outer diameter of the support 35A. The cam member 36 is pivotally supported by the support 35A inserted into the insertion hole 36A so that movement in the axial direction is restricted between a distal end surface of the boss 25D and the flange 35B.

Figure 4:
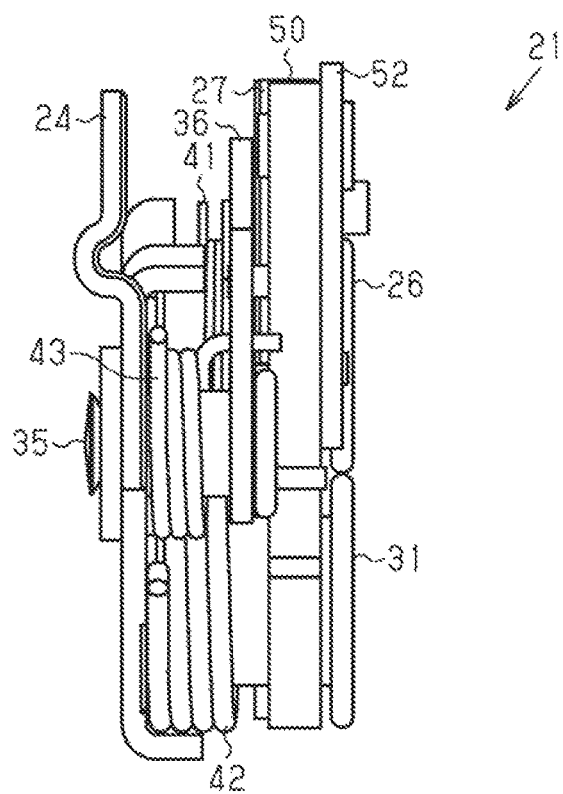
FIG. 4 is a left view of the lock unit in FIG. 2.
Figure 5:
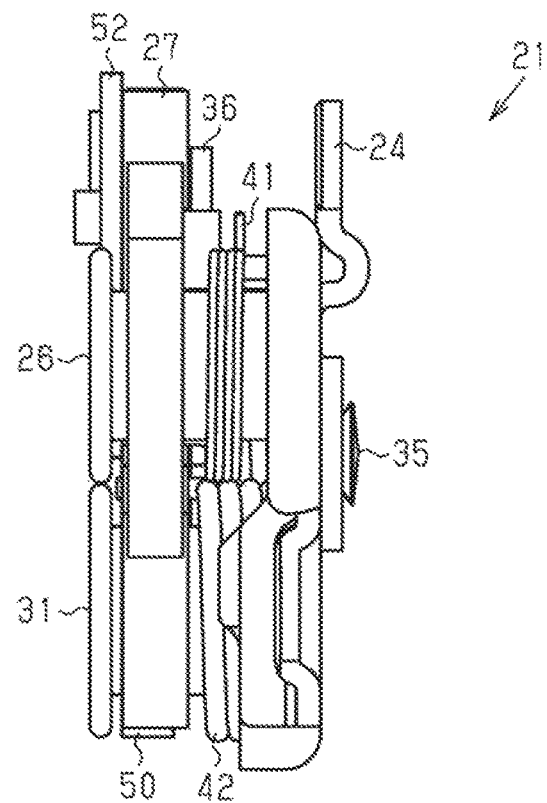
FIG. 5 is a right view of the lock unit in FIG. 2.

As shown in FIGS. 4 and 5, the cam member 36 is arranged toward the base plate 24 relative to the latch 27 and the release lever 50 in the axial direction. The thickness of the cam member 36 is set to be sufficiently less than the thickness of the latch 27 and the thickness of the release lever 50. In FIGS. 4 and 5, the base housing 25 is omitted to facilitate understanding of the positional relationship among the latch 27, the release lever 50, and the cam member 36 in the axial direction.

As shown in FIG. 2, the cam member 36 is located at the upper side of the base grooves 24A, 25A and extends from the cam pin 35 to the upper right side. The distal end of the cam member 36 includes an inclined engagement surface 36B of which the distance to the center of the cam pin 35 in the radial direction gradually increases in the counterclockwise direction in FIG. 2. The cam member 36 includes a cam groove 37 substantially extending in the extension direction of the cam member 36 and opening toward the engagement surface 36B. The end of the opening of the cam groove 37 defines a guide 37A inclined to widen the end of the opening.

As shown in FIG. 3, a cam spring 43 formed by a torsion coil spring is arranged on the distal end of the support 35A at the side of the support 35A closer to the base plate 24 than the flange 35B. The cam spring 43 has one end held by the spring seat 25G and another end held by the cam member 36. The cam spring 43 biases the cam member 36 in the clockwise direction as viewed in FIG. 2.

The engagement relationship between the cam member 36 and other parts and the action of the cam member 36 will now be described with reference to FIGS. 6 and 10.

As shown in FIG. 6, in a state in which the latch 27 is in the unlock position and the second latch engagement surface 29B of the latch 27 slides on the end of the first pawl engagement surface 32D of the pawl 32, the pawl engagement projection 33 of the pawl 32 at the permitting position abuts the cam groove 37 so that the cam member 36 is held by the pawl 32. In this case, the engagement surface 36B of the cam member 36 is outside the pivoting path of the second latch projection 30B.

As shown in FIG. 10, in a state in which the latch 27 is in the lock position and the second latch engagement surface 29B of the latch 27 abuts the second pawl engagement surface 32E, the pawl engagement projection 33 of the pawl 32, which is in the restriction position, is separated from the cam groove 37. Thus, the cam member 36 is biased by the cam spring 43 and pivoted in the clockwise direction as viewed in FIG. 10. In this case, the inclined engagement surface 36B of which the distance in the radial direction is gradually increased in the above described manner is pressed against the latch engagement surface 30C of the second latch projection 30B of the latch 27 at the lock position. This further pivots the latch 27 in the clockwise direction in FIG. 10, namely, in the direction from the unlock position to the lock position until the striker 20 in the latch groove 27B abuts the bottom surfaces 241A, 251A of the base grooves 24A, 25A. In addition, although the first latch engagement surface 29A separates from the step 32C of the pawl 32 in the circumferential direction about the insertion hole 27A as the latch 27 pivots, the step 32C is still arranged in the pivoting path of the first latch engagement surface 29A. Further, the second latch engagement surface 29B slides on the second pawl engagement surface 32E as the latch 27 pivots. This limits pivoting of the pawl 32 from the restriction position.

The action of the pawl 32, the latch 27, and the cam member 36 when the operation switch 22A (see FIG. 1) is operated (hereafter referred to as "the lock release operation") will now be described.

A lock release operation is performed by the user when the latch 27 is located in the lock position. When the operation lever 22 is moved by the lock release operation, the pawl 32 is pivoted from the restriction position shown in FIG. 10 to a lock release position shown in FIG. 8 via the permitting position shown in FIG. 6. The lock release position refers to the position of the pawl 32 (position of the release lever 50) in which neither the first pawl engagement surface 32D nor the second pawl engagement surface 32E of the pawl 32 is in contact with the latch 27.

The lock release operation pivots the pawl 32 in the counterclockwise direction from the restriction position shown in FIG. 10 to the lock release position against the biasing force of the pawl spring 42 (see FIG. 3). This presses the pawl engagement projection 33 against the guide 37A. When the guide 37A is pressed, the cam member 36 pivots about the insertion hole 36A in the counterclockwise direction in FIG. 10 while disengaging the engagement surface 36B from the second latch projection 30B. When the engagement surface 36B is completely disengaged from the second latch projection 30B, the latch 27 is biased by the latch spring 41 and pivoted in the counterclockwise direction from the position shown in FIG. 10.

Further, as the pawl 32 pivots in the counterclockwise direction from the restriction position to the lock release position against the biasing force of the pawl spring 42, when the pawl 32 passes the permitting position, the inner circumferential surface of the engagement release member 52 comes into contact with the first latch projection 30A of the latch 27. When the pawl 32 and the engagement release member 52 further pivot in the counterclockwise direction from the position shown in FIG. 9, the biasing force of the latch spring 41 and the pressing force of the engagement release member 52 based on the pivoting of the pawl 32 aid pivoting of the latch 27 so that the latch 27 pivots in the counterclockwise direction and returns to the unlock position as shown in FIG. 6. Further, as the pawl 32 pivots from the restriction position to the lock release position, the cam member 36 including the cam groove 37 into which the pawl engagement projection 33 of the pawl 32 is fitted pivots in the counterclockwise direction in cooperation with the pivoting of the pawl 32 and the engagement release member 52.

The operation of the present embodiment will now be described.

When the latch 27 is in the unlock position and the pawl 32 is in the permitting position as shown in FIG. 6, the pawl engagement projection 33 is in contact with the guide 37A so that the cam member 36 is held by the pawl 32 at a pivotal position that clears the movement path of the movement of the latch 27. In this state, when the striker 20 is inserted into the base grooves 24A, 25A as the seat back 12 (see FIG. 1) is raised rearward, the latch 27 pressed by the striker 20 is pivoted in the clockwise direction from the position shown in FIG. 6 against the biasing force of the latch spring 41. The striker 20 inserted into the base grooves 24A, 25A enters the latch groove 27B. At this stage, the pawl 32 maintains a state in which pivoting of the latch 27 is permitted, and the cam member 36 held by the pawl 32 maintains a state in which the movement path of the latch 27 is clear.

Then, when the latch 27 pressed by the striker 20 further pivots in the clockwise direction in a state immediately before being locked as shown in FIG. 9, the first pawl engagement surface 32D is released from the latch 27 and the pawl 32 is biased and pivoted by the pawl spring 42 in the clockwise direction from the position shown in FIG. 9 and moved to the restriction position shown in FIG. 10. This restricts pivoting of the latch 27 in the direction from the lock position to the unlock position. The latch 27 in the lock position fixes the striker 20, which is in the latch groove 27B, between the latch 27 and the base grooves 24A, 25A. The cam groove 37 is released from the pawl engagement projection 33 of the pawl 32 so that the cam member 36 is biased and pivoted by the cam spring 43 in the clockwise direction as viewed in FIG. 10. The cam member 36 presses the engagement surface 36B against the second latch projection 30B and further pivots the latch 27 in the clockwise direction in FIG. 10 until the striker 20 in the latch groove 27B abuts the bottom surfaces 241A, 251A of the base grooves 24A, 25A. This limits loosening of the striker 20.

Further, if the latch 27 in the lock position is pressed by the striker 20 that acts to move out of the base grooves 24A, 25A, the inclined engagement surface 36B, which is pressed against the second latch projection 30B, restricts pivoting of the latch 27 in the counterclockwise direction from the position shown in FIG. 10, namely, pivoting in the direction from the lock position to the unlock position is restricted as long as the acting force is small. Even if buckling of the cam member 36 caused by strong external force acts to separate the engagement surface 36B and the second latch projection 30B, the step 32C of the pawl 32 at the restriction position is opposed to the first latch engagement surface 29A of the latch 27. This continues restriction of pivoting of the latch 27 in the counterclockwise direction from the position shown in FIG. 10.

If the latch 27 is in the lock position and the pawl 32 is in the restriction position as shown in FIG. 10, when operation of the operation switch 22A pivots the pawl 32 in the counterclockwise direction from the position shown in FIG. 10 against the biasing force of the pawl spring 42 (see FIG. 1), the cam member 36, of which the guide 37A is pressed against the pawl engagement projection 33, is pivoted in the counterclockwise direction from the position shown in FIG. 10 as the engagement surface 36B separates from the second latch projection 30B. This releases the second latch projection 30B of the latch 27 from the engagement surface 36B of the cam member 36.

When the step 32C of the pawl 32 reaches a terminal of the first latch engagement surface 29A (boundary between the first latch engagement surface 29A and the second latch engagement surface 29B) as shown in FIG. 9, fitting of the pawl engagement projection 33 of the pawl 32 into the cam groove 37 of the cam member 36 is started. Then, the engagement release member 52 contacts the first latch projection 30A of the latch 27.

Figure 8:
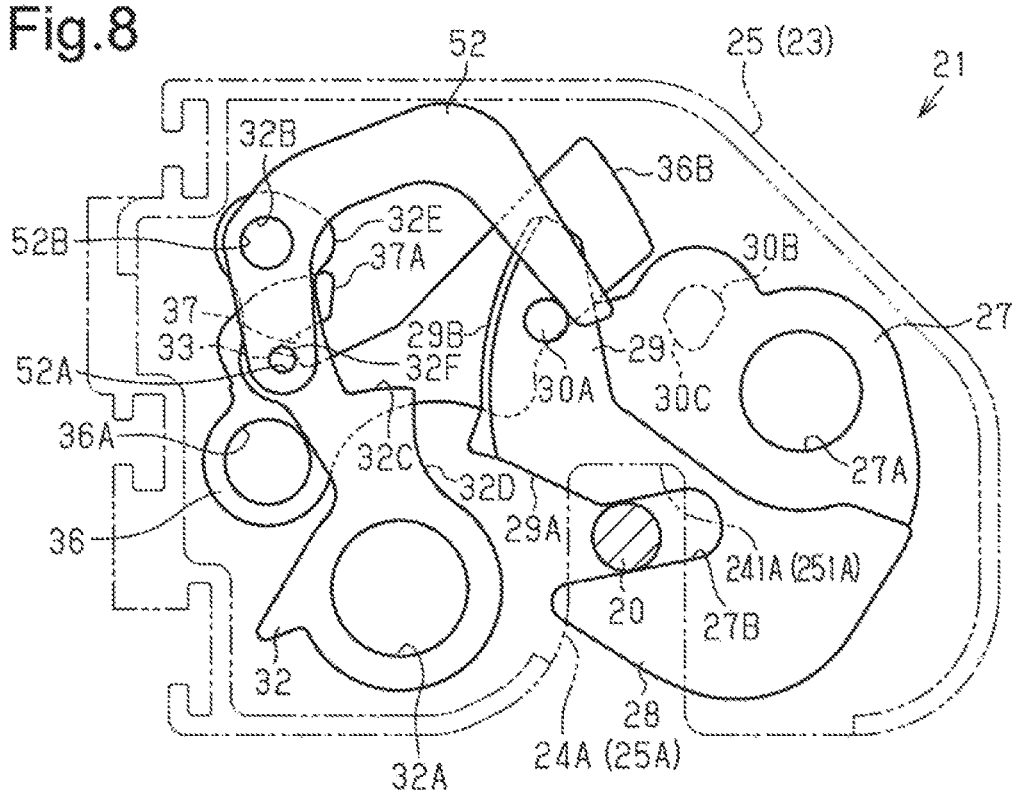
FIG. 8 is a front view schematically showing the lock unit in FIG. 2 when a release lever is in a lock release position.

As the pawl 32 and the engagement release member 52 further pivot, the engagement release member 52 presses the latch 27 in the counterclockwise direction in FIG. 8, namely, the direction toward the unlock position. This aids the pivoting of the latch 27. As a result, the striker 20 is pressed by the latch 27 and separated from the base grooves 24A, 25A. The lock release operation thus releases the engagement of the striker 20 and the lock unit 21. Then, when the operation lever 22 (see FIG. 1) is released, the pawl 32 is biased and pivoted by the pawl spring 42 (see FIG. 3) until the first pawl engagement surface 32D abuts the second latch engagement surface 29B so that the pawl 32 returns to the permitting position shown in FIG. 6.

During the lock release operation, the striker 20 may be moved into the base grooves 24A, 25A by unexpected force (hereafter referred to as "the reverse force") due to the weight of the seat back 12 or the like. In such a case, the latch 27 may pivot in the clockwise direction in FIG. 8 against the biasing force of the latch spring 41. In particular, after the lock release operation is completed, that is, when force of the operation lever 22 is not applied to the pawl 32, the engagement release member 52 is released from the first latch projection 30A to reduce the force aiding pivoting of the latch 27 to the unlock position. In this case, if the above reverse force acts on the striker 20, the latch 27 may pivot in the clockwise direction in FIG. 8.

In such a case, as the latch 27 pivots in the clockwise direction in FIG. 8 against the biasing force of the latch spring 41, the pawl 32 is pivoted in the clockwise direction from the position shown in FIG. 8 by the biasing force of the pawl spring 42 and sets a middle position where the pawl 32 contacts the latch 27.

Figure 7:
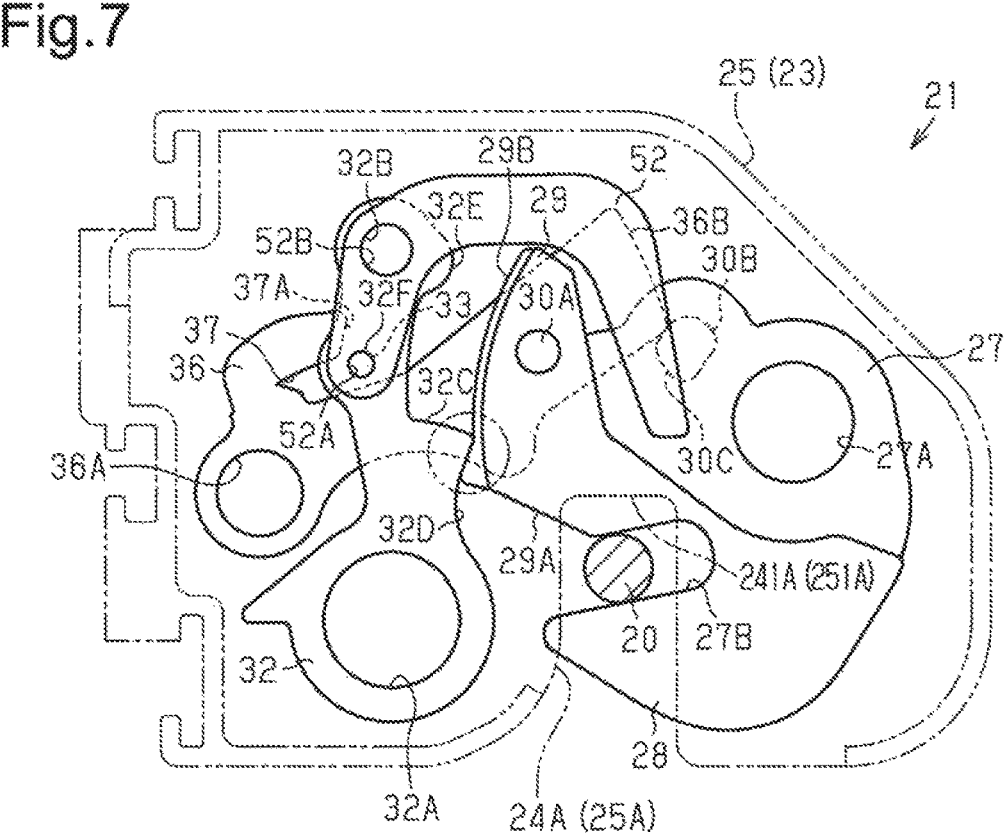
FIG. 7 is a front view schematically showing the lock unit in FIG. 2 when the latch is in a middle position.

As shown in FIG. 7, at the middle position, the terminal end of the first pawl engagement surface 32D of the pawl 32 (end of first pawl engagement surface 32D located near step 32C) is engaged with an initiating portion of the second latch engagement surface 29B of the latch 27 (end of second latch engagement surface 29B located near first latch engagement surface 29A). In other words, the latch 27 is in engagement with the pawl 32 at the middle position. This restricts pivoting of the latch 27 to the lock position. Since pivoting of the latch 27 to the lock position is restricted and the latch 27 temporarily stops, pivoting of the latch 27 to the unlock position is subsequently started by the pressing force of the striker 20. In this manner, unexpected engagement of the striker 20 and the lock unit 21 is limited during the lock release operation.

The present embodiment has the following advantages.

(1) When the release lever 50 pivots from the restriction position to the lock release position, the engagement release member 52 contacts the first latch projection 30A of the latch 27 and pivots the latch 27 from the lock position to the unlock position. This easily releases the striker 20 serving as the stationary member and the base member 23 serving as the movable member from a locked state with a simple structure.

(2) As the release lever 50 pivots from the restriction position to the lock release position, the cam member 36 is disengaged from the latch 27. This easily pivots the latch 27 from the lock position to the unlock position.

(3) As the release lever 50 pivots from the restriction position to the lock release position, after disengagement of the cam member 36 and the latch 27, the release lever 50 brings the engagement release member 52 and the latch 27 into contact and pivots the latch 27 to the unlock position. This smoothly pivots the latch 27 from the lock position to the unlock position.

(4) The engagement release member 52 is shaped to allow for engagement with the first latch projection 30A as the release lever 50 pivots from the restriction position to the lock release position in order to pivot the latch 27 to the unlock position. Preferably, the engagement release member 52 is shaped to contact the first latch projection 30A only when the release lever 50 moves from the restriction position shown in FIG. 10 beyond the permitting position shown in FIG. 9. This limits interference between the latch 27 and the release lever 50 and smoothly pivots the latch 27 to the unlock position.

(5) The latch 27 is configured to be set in an engagement state. Preferably, the latch 27 is configured to be in engagement with the pawl 32. This prevents the latch 27 from returning to the lock position when the latch 27 pivots from the lock position to the unlock position.

The above embodiment may be modified as described below.

In the above embodiment, the pawl 32 and the engagement release member 52 may be integrally formed. In the modification, the first latch projection 30A of the latch 27 is arranged on, for example, the circumferential surface of the second engagement portion 29.

In the above embodiment, the positional relationship of the latch 27 and the cam member 36 may be reversed, and the positional relationship of the second latch projection 30B and the engagement surface 36B may be reversed. That is, the cam member 36 may include a projection projecting in the thickness-wise direction, and the projection may be pressed against an engagement surface formed on an end surface of the latch 27 so that the latch 27 is pivoted to abut the striker 20 against the bottom surfaces 241A, 251A of the base grooves 24A, 25A.

In the above embodiment, the cam groove 37 of the cam member 36 may be replaced with a cam hole into which the pawl engagement projection 33 is loosely inserted and engaged.

In the above embodiment, the vehicle serving as the stationary member may include the lock unit 21, and the seat back 12 serving as the movable member may include the striker 20.

The vehicle lock device of the above embodiment may be applied to a slide device that adjusts a front-rear position of the seat cushion 11, a lift device that adjusts a vertical position of the seat cushion 11, an adjustment device that adjusts the length of the seat cushion 11, or an ottoman device. Alternatively, the vehicle lock device of the above embodiment may be applied to a steering tilt adjustment device, a door lock device, or the like that adjusts the position of a movable member installed on the vehicle.

The invention claimed is:

1. A vehicle lock device comprising:
   a base member including a base groove, into which a striker fixed to one of a stationary member and a movable member is inserted, wherein the base member is fixed to the other one of the stationary member and the movable member;
   a latch pivotally connected to the base member, wherein the latch includes a latch groove into which the striker is inserted, and the latch is pivotal between a lock position, at which the striker is fixed to the base groove, and an unlock position, at which the striker is released from the base groove; and
   a release lever pivotally connected to the base member, wherein the release lever is pivotal between a lock release position, at which pivoting of the latch is permitted from the lock position to the unlock position, and a restriction position, at which pivoting of the latch is restricted from the lock position to the unlock position, and the release lever is pivoted from the restriction position to the lock release position by a lock release operation,
   wherein the release lever includes an engagement release member that moves into contact with the latch and presses the latch to pivot the latch from the lock position to the unlock position as the release lever pivots from the restriction position to the lock release position.

2. The vehicle lock device according to claim 1, further comprising a cam member pivotally connected to the base member and engaged with the latch at the lock position, wherein when the latch is located at the lock position and the release lever is pivoted from the restriction position to the lock release position, the release lever contacts the cam member and releases the engagement of the cam member and the latch.

3. The vehicle lock device according to claim 2, wherein when the release lever is pivoted from the restriction position to the lock release position, after the engagement of the cam member and the latch is released, the release lever brings the engagement release member and the latch into contact to pivot the latch to the unlock position.

4. The vehicle lock device according to claim 1, wherein the latch is configured to be in an engagement state engaged with the release lever at a middle position from when pivoting of the latch is started by the engagement release member from the lock position toward the unlock position to when the latch reaches the unlock position, and
   the release lever restricts pivoting of the latch to the lock position in the engagement state.

5. The vehicle lock device according to claim 1, wherein the latch includes a latch projection projecting from a surface of the latch in a thickness-wise direction of the latch, and the release lever presses the latch at the latch projection.

* * * * *